United States Patent
Kobayashi et al.

[11] Patent Number: 6,061,459
[45] Date of Patent: May 9, 2000

[54] SURFACE-MOUNTED ELECTROMAGNETIC SOUND GENERATING BODY

[75] Inventors: Takashi Kobayashi; Atushi Kuwabara, both of Fujuyoshida, Japan

[73] Assignee: Citizen Electronics Co., Ltd., Yamanashi-ken, Japan

[21] Appl. No.: 08/890,426

[22] Filed: Jul. 9, 1997

[30] Foreign Application Priority Data

Jul. 9, 1996 [JP] Japan .................................. 8-179066

[51] Int. Cl.⁷ .............................. H04R 1/02; H04M 1/00
[52] U.S. Cl. ........................ 381/386; 381/392; 381/393; 379/420; 379/428; 379/433
[58] Field of Search ..................................... 381/386, 392, 381/393, 394, 395; 379/420, 428, 433

[56] References Cited

U.S. PATENT DOCUMENTS 5,461,672 10/1995 Enokido et al. ..................... 379/433

*Primary Examiner*—Curtis A. Kuntz
*Assistant Examiner*—Phylesha Dabney
*Attorney, Agent, or Firm*—Browdy and Neimark

[57] ABSTRACT

In the surface-mounted electromagnetic sound generating body in which a thin resin casing incorporating a sound generating unit is formed with a sound release hole, a sound leakage prevention member separate from the casing is provided around the sound release hole. This arrangement reduces the number of processes for assembling the surface-mounted electromagnetic sound generating body in the manufacture of a mobile phone and at the same time minimizes the volume occupied by the surface-mounted electromagnetic sound generating body on a printed circuit board.

10 Claims, 6 Drawing Sheets

SURFACE-MOUNTED ELECTROMAGNETIC SOUND GENERATING BODY

BACKGROUND OF THE INVENTION

1. Field of the Invention

The present invention relates to a surface-mounted electromagnetic sound generating body incorporated in mobile communications devices, such as cellular telephones and pagers, that generates an incoming call indicator tone when the device receives an incoming call, and more particularly to a thin surface-mount type electromagnetic sound generating body mounted on the surface of a printed circuit board in a mobile communications device.

2. Description of the Prior Art

A known example of the surface-mounted electromagnetic sound generating body 1 of this kind includes a thin type which incorporates a vibration sound generating unit (not shown) in a rectangular parallelepiped resin casing 2, as shown in FIG. 1. The surface-mounted electromagnetic sound generating body 1, as shown in FIG. 2, is incorporated in a body case 3 such as a mobile phone and mounted on a printed circuit board 4. The casing 2 has a sound release hole 5 formed in one side. When it is surface-mounted on the printed circuit board 4, the body 1 is so arranged that the sound release hole 5 faces an opening 6 formed in the body case 3. When a mobile phone is assembled, a sound leakage prevention packing 7 is provided in a gap between the sound release hole 5 and the opening 6 in the body case 3 to prevent an incoming call indicator tone from becoming indistinct. This packing 7 has a hollow portion 7a, in which the casing 2 of the surface-mounted electromagnetic sound generating body 1 is installed, and a through-hole 7b that communicates the sound release hole 5 with the opening 6. The electromagnetic sound generating body 1 is mounted on the printed circuit board 4 and then the casing 2 is fitted over the body 1 from above. The inner side of the body case 3 around the opening 6 is bonded with a dust prevention cloth 8 to prevent dust, foreign matters, water droplets and humid air from entering into the body case 3. The front side of the packing 7 is pressed against the dust prevention cloth 8. In this state the body 1 is incorporated in the body case 3.

FIG. 3 and 4 show another example of the conventional packing 9, The packing 9 has a hollow portion 9a to cover the front half of the casing 2 and a through-hole 9b for communicating the sound release hole 5 to the opening 6. The packing 9 also has a double-sided adhesive tape 10 attached to the side of the hollow portion 9a around the through-hole 9b. When a mobile phone is assembled, a cover sheet is removed from the double-sided adhesive tape 10, which is then bonded to the periphery of the sound release hole 5 to fix the packing 9 to the casing 2.

With the conventional surface-mounted electromagnetic sound generating body 1 described above in the first and second examples, however, because the body 1 and the packing 7 or 9 are supplied separately to the mobile phone assembly line, the packing 7 or 9 must be attached, in a separate process, to the casing 2 of the body 1 surface-mounted on the printed circuit board 4.

Further, because the packing 7, 9 is formed as a cover that encloses the entire or front half of the casing 2, the volume occupied by the surface-mounted electromagnetic sound generating body 1 on the printed circuit board 4 increases, giving rise to a problem of greater limitations in mounting other parts.

SUMMARY OF THE INVENTION

A first object of this invention is to provide a surface-mounted electromagnetic sound generating body that can reduce the number of assembly processes in the manufacture of a mobile phone or other communications devices.

A second object of this invention is to minimize the volume occupied by the surface-mounted electromagnetic sound generating body on a printed circuit board during the manufacture of the mobile phone.

To achieve the above objectives, the surface-mounted electromagnetic sound generating body comprises: a sound generating unit; a thin casing made of resin and incorporating the sound generating unit, the casing having a sound release hole; a sound leakage prevention member provided around the sound release hole; and electrode terminals provided on an outer surface of said casing; and wherein said sound leakage prevention member has a pair of leg portions fixed to a periphery of the sound release hole and a body portion formed integrally with said leg portions and is mounted on an outer surface of said casing at the periphery of the sound release hole.

Further, the surface-mounted electromagnetic sound generating body of this invention comprises: a sound generating unit; a thin casing made of resin and incorporating the sound generating unit, the casing having a sound release hole; a sound leakage prevention member provided-around the sound release hole, the sound leakage prevention member being a separate member from the casing; and a dust prevention member provided to an outer surface of the sound leakage prevention member.

With the above configurations, the sound leakage prevention member can be fitted to the periphery of the sound release hole of the casing and firmly fixed there by ultrasonic-fusing of the upper and lower casing during the process of making the surface-mounted electromagnetic sound generating body.

Because the sound leakage prevention member is already fitted to the periphery of the sound release hole beforehand, the surface-mounted electromagnetic sound generating body of this invention eliminates the need for the process of mounting the sound leakage prevention member as required by the assembly of the conventional mobile phones, thereby reducing the number of assembly processes.

Further, in the surface-mounted electromagnetic sound generating body of this invention, because a pair of leg portions of the sound leakage prevention member is fixed to the periphery of the sound release hole, the sound leakage prevention member can be easily mounted on the casing, and it will not come off the periphery of the sound release hole and can reliably prevent leakage of sound.

Further, in the surface-mounted electromagnetic sound generating body of this invention, because the sound leakage prevention member is formed separate from the casing and securely fixed to the periphery of the sound release hole, it will not come off the periphery of the sound release hole and can reliably prevent leakage of sound.

Another advantage of the surface-mounted electromagnetic sound generating body of this invention is that because the dust prevention member is installed in place beforehand along with the sound leakage prevention member, it is possible to eliminate the process of bonding the dust prevention member as required in the conventional device.

Still another advantage of this invention is that because the sound leakage prevention member is formed of silicone rubber or other heat resisting rubbers, it does not deteriorate when subjected to high temperatures as it is passed through a furnace and can maintain the sound leakage prevention capability over a long period of time, The present invention will be described in detail in the following by referring to the accompanying drawings.

BRIEF DESCRIPTION OF THE DRAWINGS

FIG. 2 is a cross section showing the conventional surface-mounted electromagnetic sound generating body of FIG. 1 installed in a body case of a mobile phone or the like;

FIG. 4 is a cross section showing the conventional surface-mounted electromagnetic sound generating body of FIG. 3 installed in a body case of a mobile phone or the like;

FIG. 8 is a cross section showing the surfacemounted electromagnetic sound generating body of FIG. 5 installed in a body case of a mobile phone or the like.

DETAILED DESCRIPTION OF THE EMBODIMENT

Figure 1:
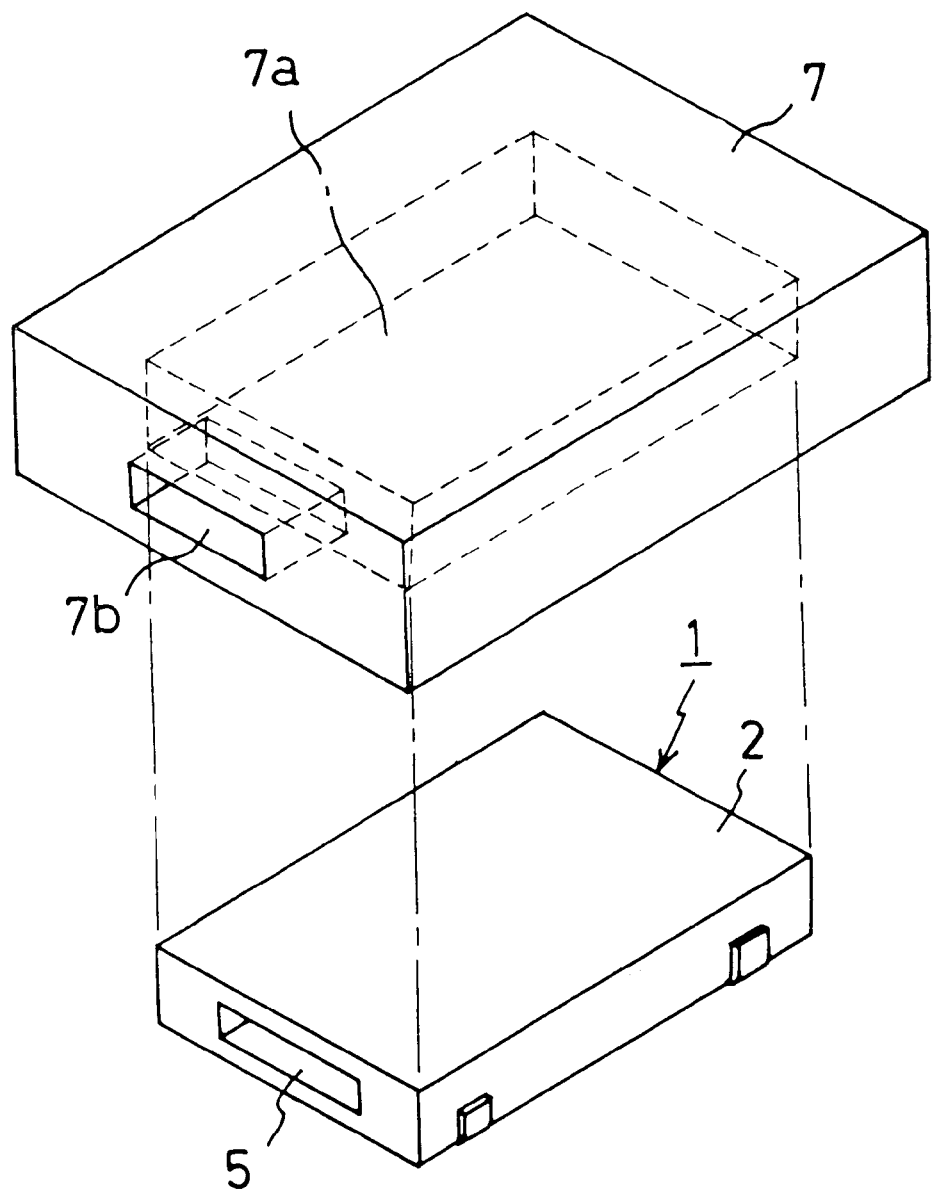
FIG. 1 is a perspective view of an example of the conventional surface-mounted electromagnetic sound generating body, showing how the packing is fitted over the casing.
Figure 2:
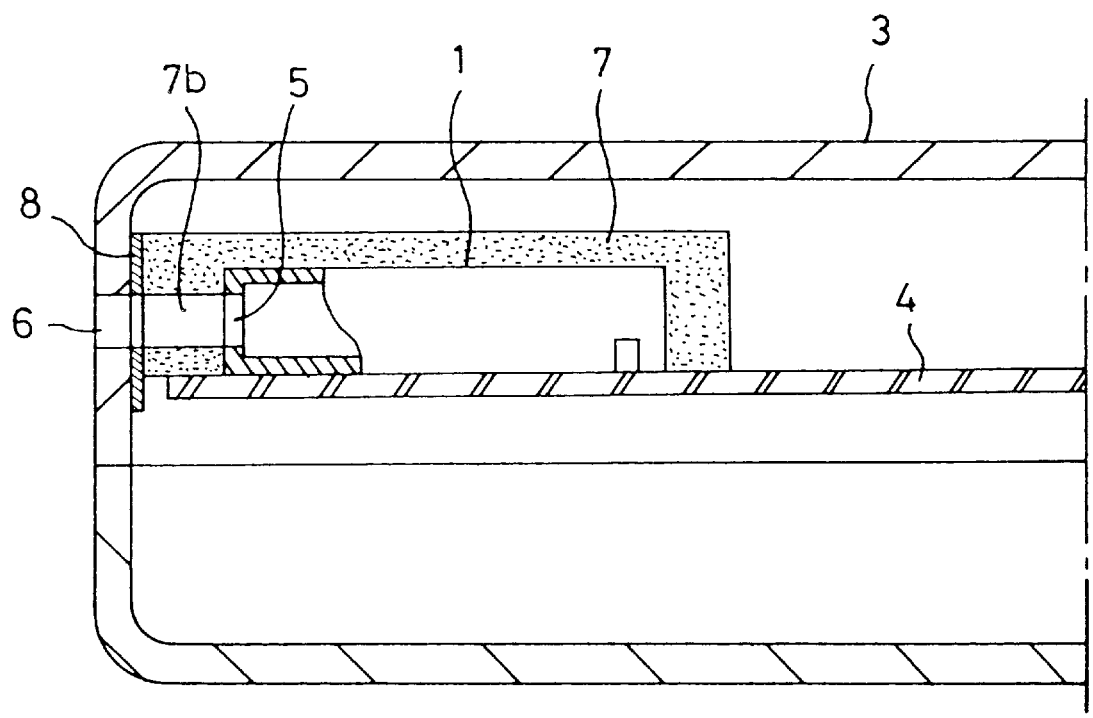
Figure 3:
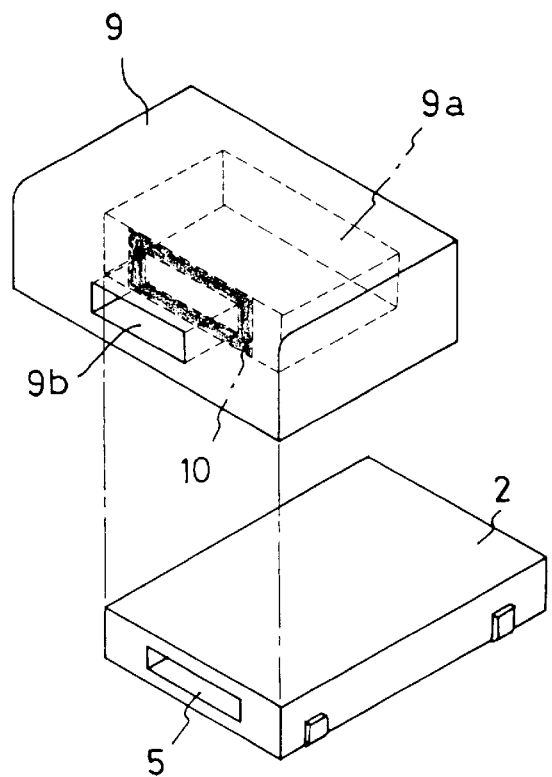
FIG. 3 is a perspective view of another example of the conventional surface-mounted electromagnetic sound generating body, showing how the packing is fitted over the front half of the casing.
Figure 4:
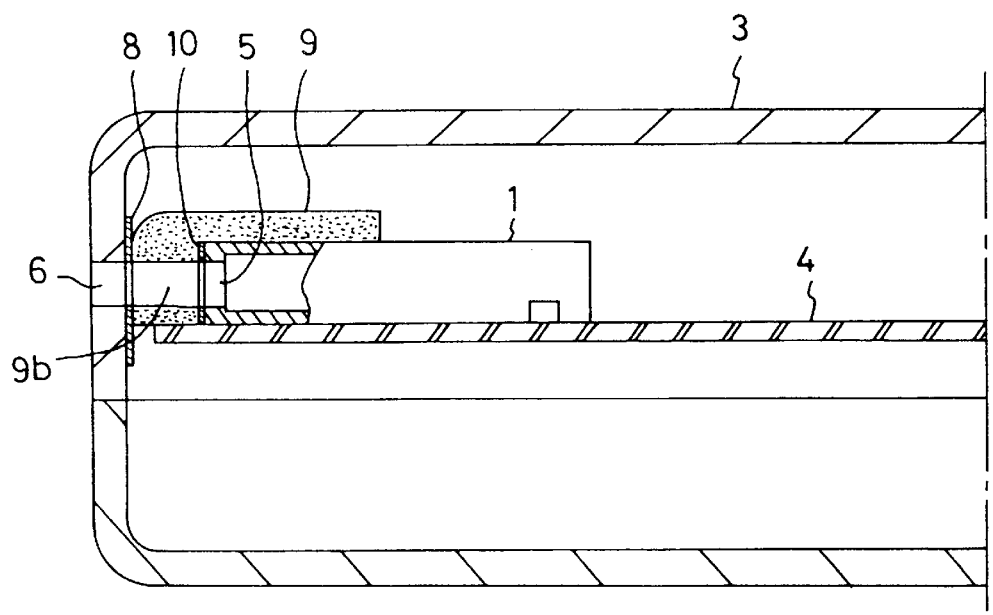
Figure 5:
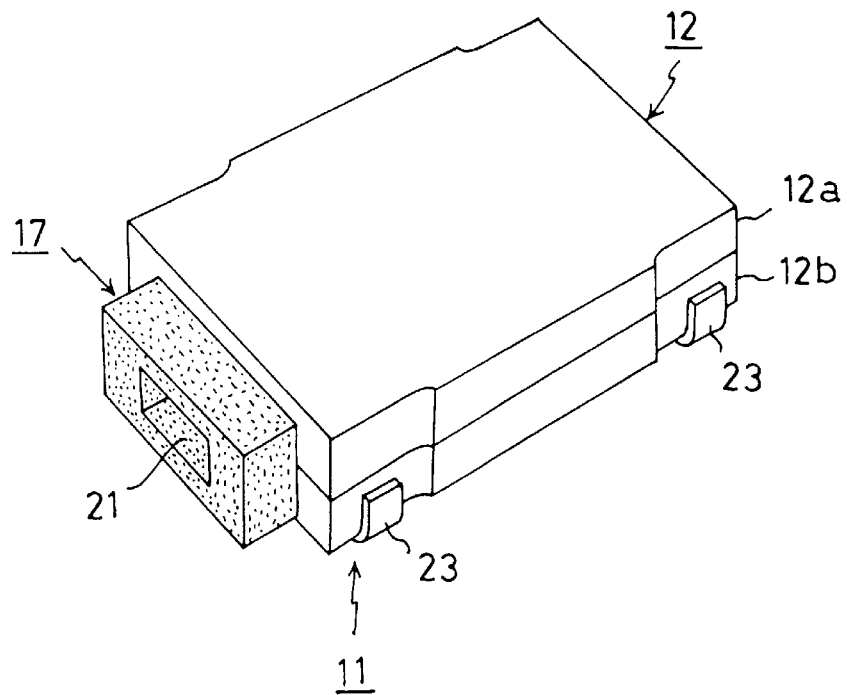
FIG. 5 is a perspective view showing one embodiment of a surface-mounted electromagnetic sound generating body of this invention.

By referring to the accompanying drawings, embodiments of the surface-mounted electromagnetic sound generating body according to this invention will be described in detail.

In the first embodiment shown in FIG. 5 to FIG. 8, a casing 12 of a surface-mounted electromagnetic sound generating body 11 comprises an upper casing 12a and a lower casing 12b and has an inner hollow space therein to accommodate a vibration sound generating unit (not shown). The casing 12 has a sound release hole 15 in one side thereof, through which an incoming call indicator tone generated by the vibration sound generating unit comes out. In this embodiment, the sound release hole 15 is fitted with a sound leakage prevention packing 17 made of silicone rubber or other heat resisting rubber.

Figure 7:
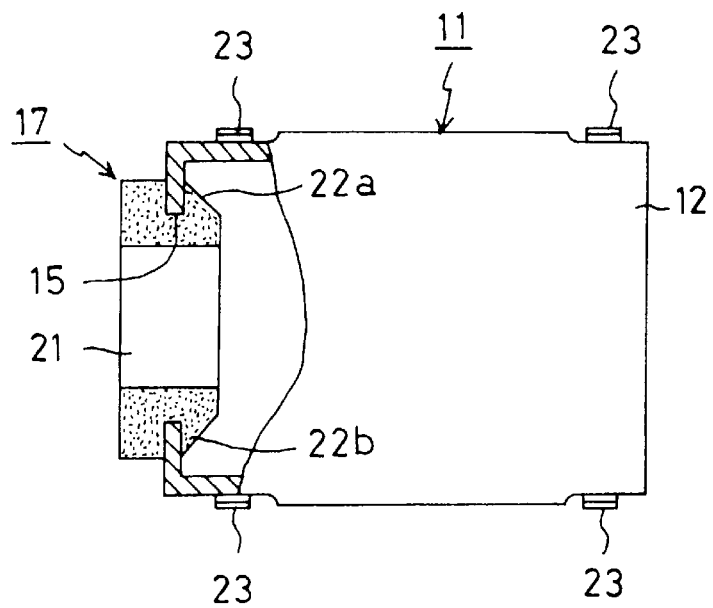
FIG. 7 is a partly cutaway horizontal cross section of the surface-mounted electromagnetic sound generating body of FIG. 5.
Figure 6:
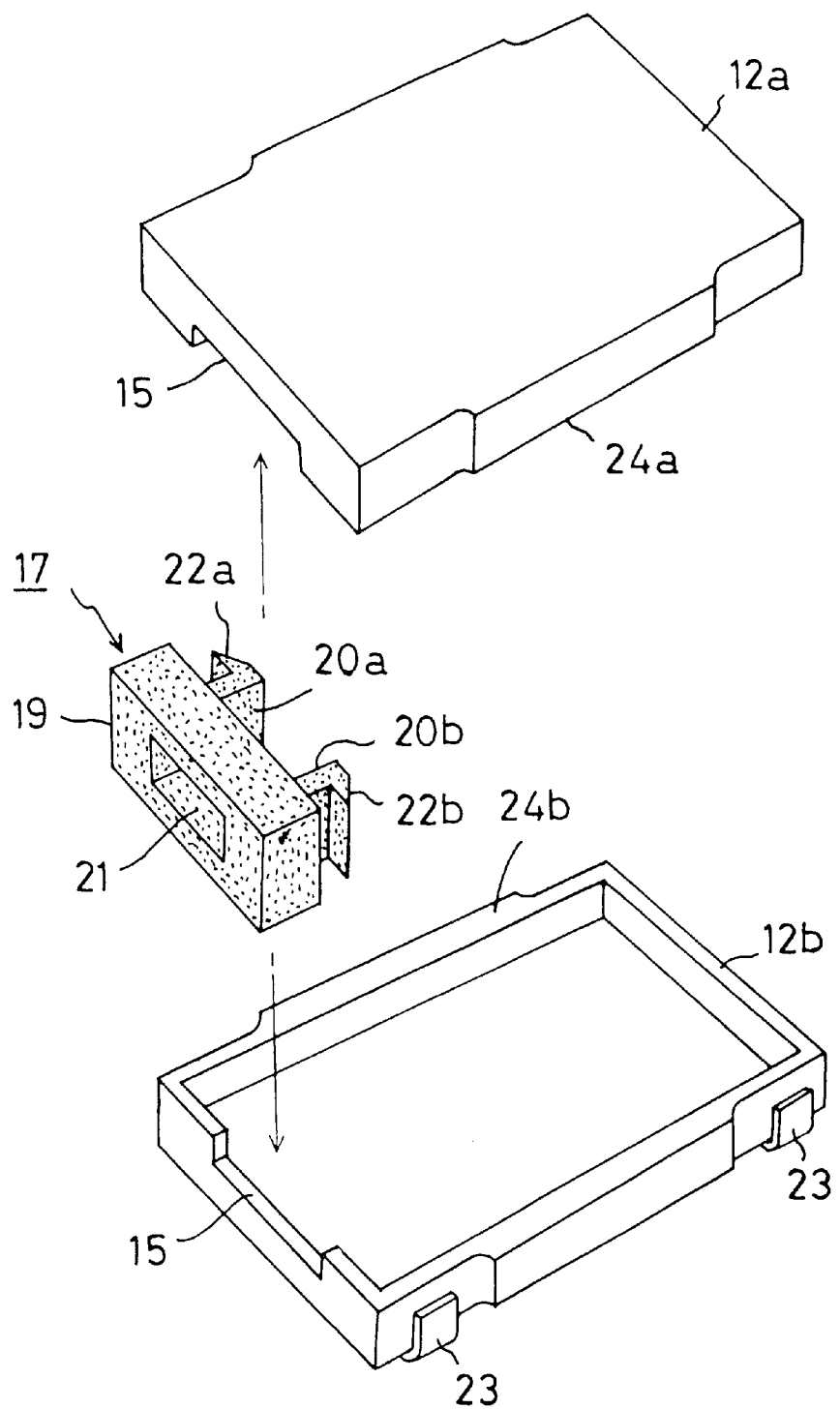
FIG. 6 is an exploded perspective view of the surface-mounted electromagnetic sound generating body of FIG. 5.
Figure 8:
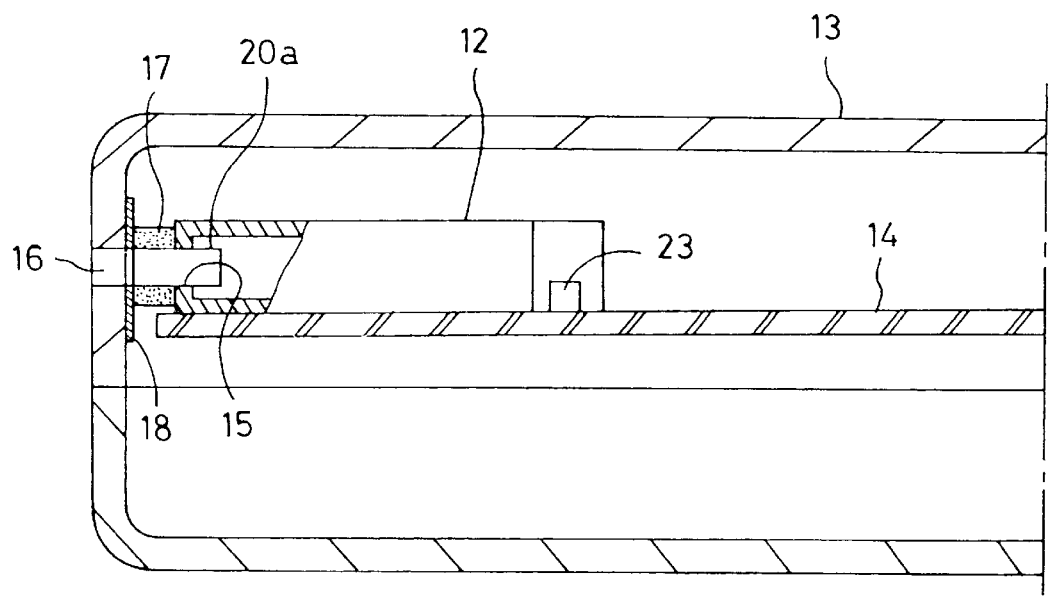

This packing 17, as shown in FIG. 6, comprises a blocklike body portion 19 and a pair of leg portions 20a, 20b formed on the rear surface side of the body portion 19. The body portion 19 has formed at its center a longitudinally extending through-hole 21 similar in shape to the sound release hole 15. The free ends of the leg portions 20a, 20b are formed with protruding engagement claws 22a, 22b that engage the inner circumferential edge of the sound release hole 15. As shown in FIG. 6 to 8, the packing 17 is securely fixed to the periphery of the sound release hole 15 by inserting the leg portions 20a, 20b between the upper casing 12a and the lower casing 12b of the casing 12 and ultrasonic-fusing the interfaces 24a, 24b of the casings 12a, 12b during the process of assembling the surface-mounted electromagnetic sound generating body 11. At the four corners of the lower casing 12b electrode terminals 23 are provided.

The electromagnetic sound generating body 11, as shown in FIG. 8, is mounted on a printed circuit board 14. During this process, the electrode terminals 23 are soldered to a pattern electrode (not shown) on the printed circuit board 14 by passing them through a heating furnace. At this time, although the packing 17 is also passed through the furnace, it is not deteriorated by heat because it is formed of heat resisting silicone rubber, Then, as shown in FIG. 8, the surface-mounted electromagnetic sound generating body 11 and its associated parts are installed in a body case 13 of a mobile phone or the like.

The surface-mounted electromagnetic sound generating body 11 is so arranged that the sound release hole 15 of the casing 12 faces an opening 16 formed in the body case 13 of the mobile phone. Further the sound generating body 11 is pressed against a dust prevention cloth 18 bonded to the inner surface of the body case 13 around the opening 16.

Because in this embodiment the casing 12 of the surface-mount type electromagnetic sound generating body 11 is fitted with the sound leakage prevention packing 17 before it is supplied to the assembly line, the surface mounting of the electromagnetic sound generating body 11 on the printed circuit board 14 can be realized only by placing the surface-mount type electromagnetic sound generating body 11 on the printed circuit board 14 and passing them through a furnace. This embodiment therefore eliminates the process of installing the packing after the electromagnetic sound generating body 11 has been surface-mounted, as required in the conventional device. Further, because the leg portions 20a, 20b of the packing 17 firmly engage the periphery of the sound release hole 15, the packing 17 does not easily come off the sound release hole 15 and can reliably prevent sound leakage. In addition, because the packing 17 does not enclose the casing itself as in the conventional device, the volume occupied by the surface-mounted electromagnetic sound generating body 11 on the printed circuit board 14 is reduced.

Figure 9:
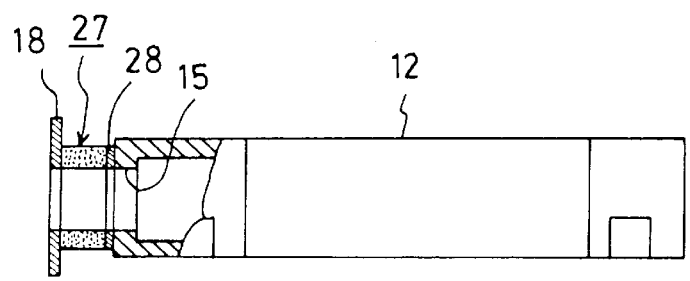
FIG. 9 is a partly cutaway cross section of another example of the surface-mounted electromagnetic sound generating body of this invention.

FIG. 9 shows a partly cutaway view of the second embodiment of this invention. A double-sided adhesive tape 28 is bonded to the rear surface of a blocklike packing 27 and also to the outer surface of the casing 12 around the sound release hole 15 to produce the same sound leakage prevention effect as that of the above embodiment. In this embodiment, too, the casing 12 may be fitted with the packing 27 beforehand and then passed through a furnace for surface mounting. Further, the dust prevention cloth 18 may be bonded to the front side of the packing 27.

While the above embodiments employ the packing 17, 27 made of silicone rubber, this invention can use other rubber materials with excellent heat resistance, such as fluororubber and acrylic rubber. Although in the above embodiments the packing 17, 27 is formed separate from the casing 17, it is possible to form the packing integral with the casing 12. In that case, the casing 12 and the packing 17, 27 may be formed of the same material or of different materials by two-color molding. Further, there is no particular limitation to the kind of the dust prevention cloth 18 in this invention.

What is claimed is:

1. A surface-mounted electromagnetic sound generating body comprising:
   a sound generating unit;
   a thin casing comprising resin and incorporating the sound generating unit, the casing including a sound release hole;
   a sound leakage prevention member provided around the sound release hole;
   electrode terminals provided on an outer surface of said casing;

wherein said sound leakage prevention member includes a pair of leg portions fixed to a periphery of the sound release hole and a body portion formed integrally with said leg portions and mounted on an outer surface of said casing at the periphery of the sound release hole.

2. The surface-mounted electromagnetic sound generating body according to claim 1, wherein the sound leakage prevention member comprises heat resisting rubber.

3. The surface-mounted electromagnetic sound generating body according to claim 2, wherein the heat resisting rubber comprises silicone rubber.

4. The surface-mounted electromagnetic sound generating body according to claim 1, comprising a dust prevention member disposed on the outer surface of the sound leakage prevention member.

5. The surface-mounted electromagnetic sound generating body according to claim 4, wherein the sound leakage prevention member comprises heat resisting rubber.

6. The surface-mounted electromagnetic sound generating body according to claim 5, wherein the heat resisting rubber comprises silicone rubber.

7. The surface-mounted electromagnetic sound generating body according to claim 1, comprising a dust prevention member disposed between the sound leakage prevention member and the casing.

8. The surface-mounted electromagnetic sound generating body according to claim 7, wherein the sound leakage prevention member comprises heat resisting rubber.

9. The surface-mounted electromagnetic sound generating body according to claim 8, wherein the heat resisting rubber comprises silicone rubber.

10. The surface-mounted electromagnetic sound generating body according to claim 1, wherein the leg portions firmly engage the periphery of the sound release hole.

* * * * *